Dec. 5, 1967  J. F. ZIEVERS  3,356,220
FILTERING APPARATUS
Filed July 21, 1964  2 Sheets-Sheet 2
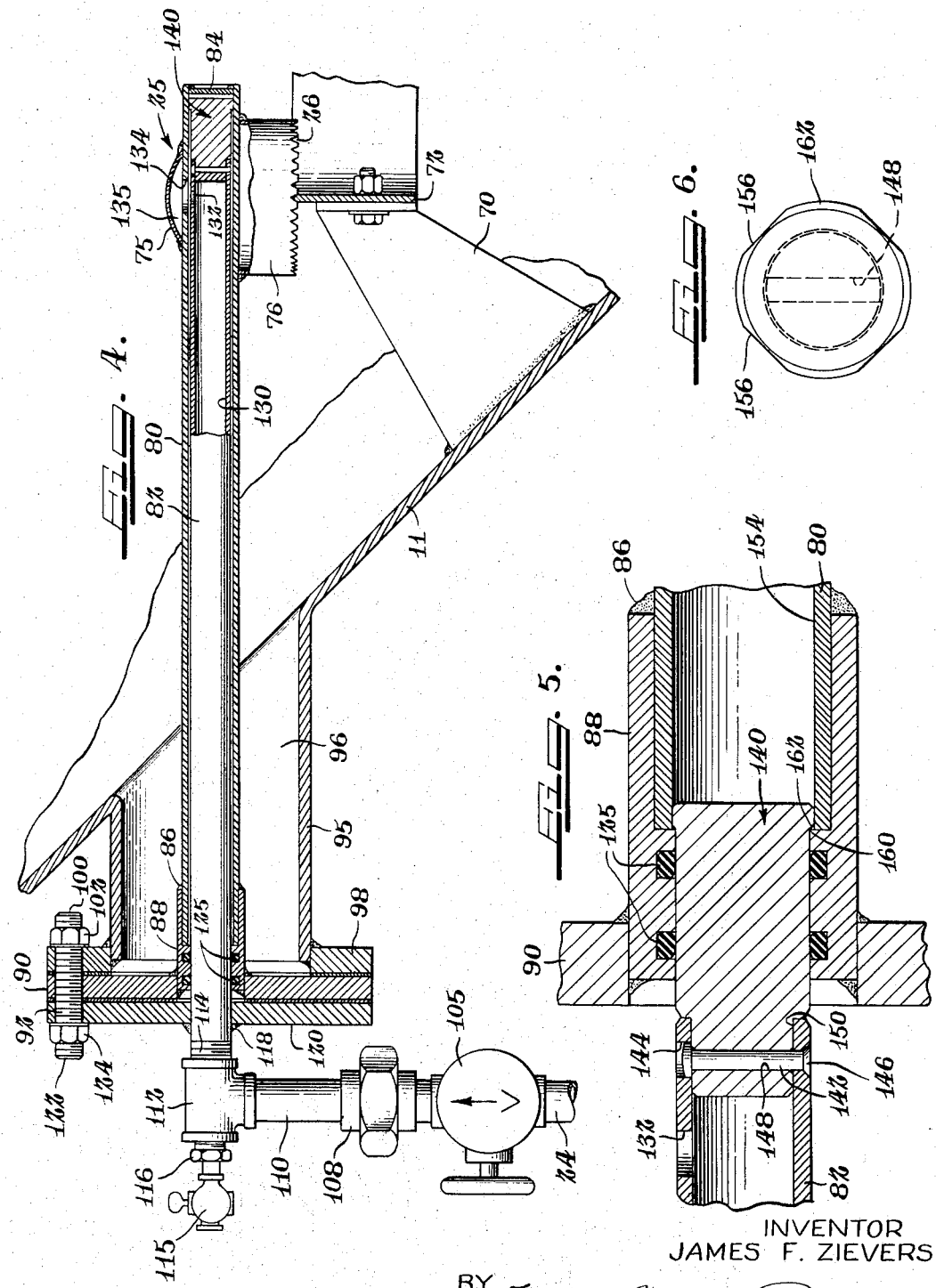
INVENTOR
JAMES F. ZIEVERS
BY Fidler, Bradley & Patnaude
Attys.

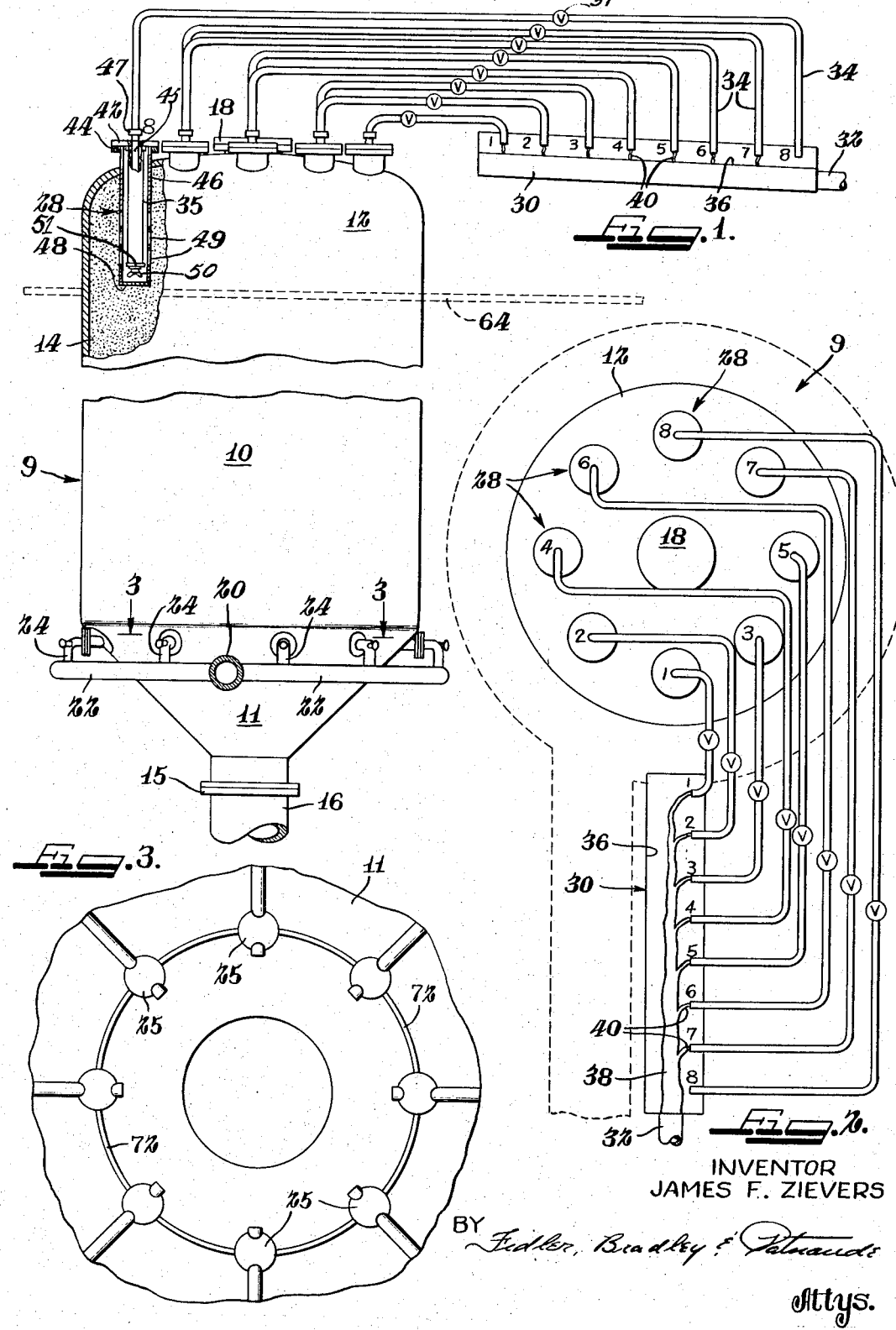

_United States Patent Office_

3,356,220
Patented Dec. 5, 1967

3,356,220
FILTERING APPARATUS
James F. Zievers, La Grange, Ill., assignor to Industrial Filter & Pump Mfg. Co., Cicero, Ill., a corporation of Illinois
Filed July 21, 1964, Ser. No. 384,060
9 Claims. (Cl. 210—234)

The present invention relates broadly to improvements in filtering apparatus; and more particularly to removable fluid feeding and/or outlet devices that can be removed and replaced through a wall of a filter column, or the like, without inhibiting continuous operation of the filter at a predetermined minimum filtering capacity.

This apparatus is characterized by elongated housings fastened to the wall of the chamber and, in at least one form, extending thereinto. The housings contain either an elongated fluid feeding tube or an elongated fluid outlet device. The internal end of the feeding tube mounts a removable plug, or check valve cooperable with a valve seat secured with respect to the wall of the chamber. When the feeding tube is withdrawn, the plug valve is movable with the feeding tube for leaving the plug in engagement with the seat after disengagement from the feeding tube. Thus the feeding tube can be cleaned, replaced, or otherwise serviced, without necessitating shutting down the filtering process and/or operation. Each elongated outlet filtering device may also operate a plug-type valve, or the like, upon removal of the filtering device.

In many filtering processes, for example clarifying syrup in sugar refining, the feed orifices of a feed-tube may become wholly or partially plugged with melassigenic materials, or foreign substances. It is a common present practice to discontinue filter operation in order to clean and/or replace orifices, or parts having orifices, or the like. It is also common to discontinue operation to replace outlet filters, although such is usually a less expensive and time-consuming shutdown.

Such shutting down can be a severe time-consuming practice, particularly with large sugar-syrup filter columns, because these may be of large volumetric capacities up to, and sometimes exceeding, 3,000 cubic feet in a 10 feet diameter 40 feet high column. The granular charcoal, or other filter media, within the filters can weigh several tons, and shutdown to service presently used feeding devices often involves removing and replacing this charcoal. In other operations, only the liquor, or syrup, is drained and re-passed through the filter. However, such re-filtering may be required for two thousand cubic feet or more of fluid, a weight of forty or more tons may be contained in large columns, and is wasteful of time and substantially increases operating costs. To provide for shutting-down such prior filters for fluid-feed servicing, ancillary apparatus including large valves, fittings, siphons, and the like, have been required. Because some filters operate at about 70 p.s.i., or more, these fittings must be of the 150 pound class, and the pipe required is at least schedule 20 in small size pipes to schedule 40 in the larger sizes. These appurtenances increase the initial capital investment and extend the erection time of a column.

The present fluid-feed apparatus does not require shutting-down. At least two feeding devices are provided in installations wherein continuous operation is desirable. In addition, in installations not thus inhibited, but wherein replacement and/or cleaning and/or repair of the feed means is desired, the present device can fill the need for facile and hence inexpensive servicing. The outlet filters are constructed so as to also be serviced conveniently while the filtering operation is being carried on.

Accordingly, it is a broad object of this invention to provide improved removable devices for feeding and/or withdrawing fluid through a column, wall, or the like.

A further object, in keeping with the preceding object, is to provide such removable devices for feeding into and receiving fluid from filter means.

A still further object in keeping with either of the preceding objects is to provide therewith bulk filter media as a filter means.

Another object, in keeping with either of the above objects, is to provide improved valve means for permitting continuous filter operation while process-associated devices are being serviced and/or replaced.

The foregoing and other attributes, advantages and features of this invention reside in details of construction, arrangement of parts, and a method of supplying and withdrawing fluid to and from filter apparatus while providing steps for cleaning the fluid supply means; and will either be obvious or pointed out in the following specification and claims when read in view of the accompanying drawings, in which:

FIG. 1 is a diagrammatic elevational view of a preferred embodiment of the invention;

FIG. 2 is a plan view of FIG. 1;

FIG. 3 is an enlarged partial interior view, looking down at fluid-feed heads within a filter column along line 3—3, FIG. 1;

FIG. 4 is a further enlarged transverse sectional view of one fluid-feed device;

FIG. 5 is a further enlarged view of parts of the fluid-feed device of FIG. 4; and FIG. 6 is an end view of a plug valve shown in half section in FIGS. 4 and 5.

For a more complete understanding of the present invention, reference is first made to FIGS. 1, 2 and 3. A pressure vessel 9 includes a vertical cylindrical column 10, and a frusto-conical bottom head 11 and a dished top head 12 suitably secured to the column 10. The column 10, or other parts, can be supported by any conventional structure, not shown. All parts comprising the vessel preferably are made of metal plate, such as boiler plate, and the vessel may be lined by material, not shown, for preventing corrosive attack on vessel parts and fittings therefor, in known manner. In the process described below, by way of example, the vessel is subjected to about five atmospheres pressure; although other processes may function best at several other higher and/or lower pressure levels.

The vessel 9 is adapted to contain a finely granulated media 14 for clarifying liquids fed into the column 10 for filtering upwardly therethrough. It is within the scope of this invention to feed from the top of the column 10 as well and draw from the bottom of the vessel 9 by suitable means, not shown. In the specific example used herein, the material 14 is activated charcoal and the process to be described is the clarification of sugar liquor to remove melassigenic and foreign substances therefrom.

The charcoal 14 can be removed from time to time from the column 10 by opening a gate valve indicated diagrammatically at 15 to permit gravitational or wash down efflux of the charcoal 14 through a pipe 16. The charcoal can be cleaned and reactivated and replaced gravitationally through a top manhole shown covered by a blind flange 18, but such flange 18 may be replaced by a suitable pipe connection from the charcoal regenerative part of the system, not shown.

Liquid to be filtered is introduced through a pipe 20 connected to a set of headers 22, each of which may be substantially identical. The headers 22 supply liquid into pipes 24 to introduce the liquid, through piping to be explained hereinafter, to heads 25 of which eight are shown in FIG. 3. The liquid in each head 25 passes out under a lower lip 26, FIG. 4, and in this example of the invention, passes upwardly through some 30 to 35 feet of granulated charcoal 14 and passes out of the column 10 through outlet filters 28 in the head 12, only one of which filters 28 is shown in section in FIG. 1. As shown in FIG. 2, there are likewise eight outlet filters 28, the heads of which are numbered 1 through 8, FIG. 2.

Each outlet filter 28 connects through a pipe 34 feeding a trough 30 connected with a pipe 32 which leads to a receiver, not shown, for the filter liquid. Each of the pipes 34 between the filter 28 and the trough 30 serve identical purposes and only one will be explained in detail. The pipe 34 feeding output station 8 from filter number 8 receives liquid that has been filtered through a tubular filter element 35 of suitable known kind in the filter 28. The filtered fluid is under pressure and thus flows upward and through a valve 37 and the pipe 34 in the direction of the arrow indicated and out of station 8 into the open top 36 of the trough 30 and to a liquid stream 38 feeding the effluent pipe 32.

The pipe 34, station 8, as indicated in FIGS. 1 and 2, is passing no liquid such as streams 40 leaving pipe outlets, numbers 1 through 7, FIG. 1. This is a visual indication that the filter 35 at station 8 is plugged and not permitting liquid to pass therethrough into the pipe 34.

As shown diagrammatically in FIG. 1, the filter element 35 is a hollow cylindrical member of porous wall construction and is attached to a flange 42 that may be suitably bolted to a fixed flange 44 secured to the upper head 12 of the vessel 9. A standpipe 45 is welded to the flange 42 and has a threaded upper end receivable in connector 47. A sleeve 46 depends from the flange 44 into the top of the vessel and terminates in a closed end 48 which is preferably round and flat. The sleeve 46 is perforated at a plurality of places 49 in the side wall thereof, as shown. The filter tube 35 is slidably received over the pipe 45 and held in place by a wing nut 50 threaded onto the lower end of the pipe 45 against an end cap 51. The pipe 45 is perforated near its lower end within the element 35.

Should the filter element 35 at station 8, for example, become damaged, or plugged, a condition readily apparent by a discolored or reduced flow therefrom into the trough 30, the associated valve 37 may be closed. When the unit 10 is next shut down for hydropulsing, the connection at the fitting 47 may be broken and the filter tube 35 quickly replaced.

For inspecting the flow of liquid 40 out of the several pipes 34, a catwalk 64 is shown in FIG. 2 as extending around the top head 12 and along the side of the trough 30. It is to be understood that the trough 30 can be remote from the column 10, however, and it is not desired that this specific arrangement of parts be interpreted in a restrictive manner.

It is of significance in this invention that any one or more filter tubes 35 can be replaced during normal shutdown periods. This attribute is particularly significant in certain processes where there must be a time rate of filtering to effect the highest productivity of the filtering process. Accordingly, a skilled inspector is afforded a convenient means for taking suitably timed samples from any of the outlets 1, 2, 3, and 1 through 8 of the pipes 34 adjacent the trough 30. The inspector is further afforded a chance to centrifuge, for chemical tests, the material as it leaves the vessel to ascertain other attributes and characteristics of the filtering function, while the same continues in process.

*Liquid feed means*

Referring now for details of construction of the feed means for the liquid to be filtered through the charcoal 14 of the vessel, reference is directed to FIGS. 4, 5 and 6. The frustro-conical bottom 11 has internally welded brackets 70 extending from the inner surface thereof, and of which there may be three or more for supporting a ring 72, FIG. 3. The ring 72, FIG. 3, is engaged by the bottom rim 26 of a supply head 25 and supports same to prevent damage to feed parts (to be explained below) when charcoal, or the like, is dumped into the vessel through the top manhole in the head 12.

Each head 25 is formed with an upper dome 75 connected to a cylindrical skirt 76 open at the serrated edge 26, through which serrations the liquid to be filtered is distributed radially. The dome 75 and sleeve 76 are periodically blown out as with steam, air, hot water or other suitable solutions during cleanout process to be described more in detail hereinbelow.

Each feeder head 25 is cross-bored in the dome 75 to receive a pipe 80 forming an external housing for a liquid feed tube 82 therein. The housing 80 has a closure plate 84 welded at the distal end of the housing 80. The other end of the housing 80 is welded as in 86 to a sleeve 88 in turn welded to a flange 90. The flange 90 is secured with a threaded stud 92 which extends out of both sides of the flange 90. Only one stud 92 is shown, however, a number of them are required and ordinary plumbing flange templates are followed according to the schedule of pipe used for making fitting, and accordingly are made in keeping with pressures to be encountered in the apparatus.

A sleeve 95 is suitably secured to the wall 11 to form an opening 96 of sufficient size to permit withdrawal and replacement of the liquid feed head 25. A flange 98 is welded to the sleeve 95 and is adapted to receive the right-hand ends 100 of the studs 92 and bear against nuts 102 to pull up the flange 90 while securing the feed head 25 in the position shown in FIG. 4. To remove a head 25 and the housing 80, the nuts 102 are removed and the entire housing can be pulled out along with the flange 90.

The liquid feed tube 82 receives liquid to be filtered from the pipe 24 through a valve 105 which is shown diagrammatically. For different purposes, it may be desired that globe valves be used to provide for throttling functions. However, in other applications, the valves 105 may be gate valves or plug valves for the purpose of feeding and/or providing a desired cleaning function, or for accommodating different consistencies of liquids or fluids or mixtures to be filtered.

The liquid to be filtered passes through a union 108 through a nipple 110 which may be used to serve a dual purpose as a sight-glass by being made of suitable pressure-resistant clear plastic. A T 112 connects with the nipple 110 and at 114 with the feed tube 82. A try cock 115 is provided in a bushing 116 on the other side of the T 112 and can be operated to test flow of pressurized liquid into the T 112. The try cock 115 further may serve as an air, or steam, or water connection for providing for flushing out the feed tube 82 and the feeder head 25.

The tube 82 is suitably welded at 118 to a flange 120 secured by the left-hand end 122 of each of the studs 92 by nuts 124. To withdraw the tubes 82 for inspection or cleaning or other desired purposes, the nuts 124 are released, after the union 108 is backed-off, to permit sliding the tube 82 out through O-ring seals 125 contained in grooves interiorly of the fixed sleeves 88.

With the parts in the position shown in FIG. 4, the fluid or liquid to be filtered flows from pipe 24 through the valve 105 connections therewith associated into the interior 130 of the fluid feed tube 82. The liquid will flow through an orifice 132 in the tube 82. The orifice 132 is arranged to register with a larger orifice 134 in the top of the housing 80. The orifices 132 and 134 are positioned to feed liquid upwardly into the space 135 in the upper part of the domed head 75 of the feeder head 25. It is preferred, in sugar syrup or liquor clarification, that the space 135 be filled with air under pressure and the liquid will be driven down in the sleeve or skirt 76 of the head 25 to leave through serrations in the lower lip 26 thereof.

As explained above, the liquid to be filtered will then pass upwardly through the activated carbon 14 and pass into the outlet sleeve 46 through the filter 35 and the pipes 34 to the delivery trough 30.

When sugar liquor is filtered, melassigenic constituents and certain foreign materials are contained therein. This specific process used herein, by way of example, is adapted to remove such material. These constituents and materials have a tendency to stick to, and build up, and plug the orifices 132 in the tubes 82 which can inhibit flow of liquid therethrough. Certain required cleaning can be done by using air under pressure supplied by suitable connections, not shown, to the try cocks 115 to forcibly expel the collected materials out of the orifice 132. However, continued expulsion of same can cause an undesired build-up in the dome 135, and it is preferred that such build-up be removed exteriorly of the filter apparatus.

To prevent leakage of the contents of the vessel, it is a particular attribute of this invention that means are provided for semi-automatically shutting off back flow of liquid when the tube 82 is drawn to the left as shown in FIG. 5 to expose the feed orifice 132 exteriorly of the flange 90; or completely withdraw the tube 82 for replacement of the tube, or an orifice, or the like.

When the tube 82 is drawn toward the left as viewed in FIGS. 4 and 5, a plug valve 140 is drawn along therewith. The plug valve 140 is secured to the tube 82 by a rivet 142 passed through a hole 144 and secured by an expanded end 146 of the rivet 142. The central body of the rivet 142 passes through a cross bore 148 in a shouldered and reduced end 150 of the plug valve 140.

The plug 140 engages a circular seat 160 at a chamfered annular surface 162 on the plug 140, FIG. 5. The surface 160 extends completely around the cylindrical or circular surface of the plug valve 140.

In the position shown in FIG. 5, the orifice 132 is exposed and can be mechanically cleaned out or can be back-washed by supplying a suitable cleaning liquid, or air, or steam, or the like, into the orifice 132 to blow out the interior of the pipe 82 and other connections therewith.

If it is desired to replace the tube 82, a suitable tool can engage the end 146 of the rivet 142 and the same can be driven upwardly and outwardly of the hole 144 in the tube 82. With the tube 82 and associated parts removed from the apparatus, a new tube may be quickly riveted to the plug 140 and inserted to keep down time of the particular feeder station being serviced at a minimum. However, during such down time, the other seven remaining feeder heads 25, in the example used herein, can remain in operation while the one is being serviced or replaced.

In order to prevent undesired "breathing" of the plug valve 140 as the same is moved back and forth along the internal surface 154 of the housing pipe 80, the plug valve 140 is preferably made of square stock to provide flat surfaces 156, or can be made of round stock or other shaped stock to provide for relief surfaces over which liquid can pass around the plug 140 when inserting or withdrawing the tube 82 from the pipe 80.

*Operation*

In the sugar refining operation including the step of clarification of syrup, activated charcoal is supplied through the top opening in the head 12. At this time, the gate valve 15 is closed. With this apparatus, the charcoal can be dumped rapidly because the feeder heads 25 are supported by the ring 72 to absorb impact and the pressure of the accumulation of charcoal above the heads. The double pipe and tube, 80 and 82 respectively, also comprise high strength construction to resist these forces and pressures.

With the charcoal in place, the syrup can be introduced in pipe 20, headers 22, pipe connections 24 and intermediate connections to the feeder heads 25. Before starting up, in some operations, it is preferred that each try cock 115 be connected with a pressure air hose to provide a dome of air in the spaces 135 in the feeder heads 25. Thereafter, the syrup is introduced for filtering upwardly through the charcoal 14, FIG. 1. From time to time, air can again be introduced to the spaces 135.

In this process, the columns are usually operated continuously and inspectors make periodic inspection of flow of clarified syrup into the trough 30 from the several outlet filters 28. These filters may be replaced in the manner set forth above as required, when stopped up flow from the several outlets 1 through 8, inclusive, appears at the outlets of pipes 34 adjacent the open top 36 of the filter trough 30. The separate feeder tubes 82, and the orifices 132 thereof can be inspected readily in the manner set forth in detail above.

When the character of the filtered syrup indicates that the charcoal 14 needs replacement, the following steps are taken. The supply of pressurized syrup is shut off either at the individual valves 105 or by a master valve, not shown. The pressure in the vessel 9 will quickly attain atmospheric pressure because of communication of the pipes 34 to atmosphere, or the line flange 18 may be removed if it is desired to reduce the pressure quickly, or other suitable means, not shown, may be provided. The gate valve 15 is opened wide and the charcoal with entrained melassigenic and foreign materials therein transferred to pipe 16 to a cleaning and/or reactivating or other station, as desired, in the process. Any filter elements 35 may be replaced at this time. Immediately after the charcoal 14 is removed, the apparatus may be washed down if desired, and thereafter the valve 15 closed and a new charge of activated charcoal 14 dumped through the top opening in the head 12.

While I have shown and described in detail a preferred modification and method for servicing fluid filter columns, obviously other adaptations, modifications and arrangement of parts will appear to others working in the art. Accordingly, it is desired that the invention be not limited to the specific embodiment and example shown and described but by the scope of the following claims.

What is claimed is:

1. A filter, comprising
   a tank defining a filter chamber,
   an outlet from said chamber disposed near the top of said tank,
   a finely granulated filter medium substantially filling said tank, and
   a plurality of liquid feed devices extending into said tank near the bottom thereof,
   each of said feed devices comprising a tubular member sealably connected to a wall of said tank at one end and apertured at the top near the other end,
   an imperforate member secured to said tubular member and defining a cavity partially positioned directly above the aperture in said tube and into which said tubular member extends thereby to provide a space at least partially surrounding said tubular member and located above said aperture where air can be trapped during a filtering operation, and
   a liquid feed tube slidably positioned in said tubular member and sealably connected thereto in proximity to said tank wall and having at least one aperture therein and valve means actuated by withdrawal of said feed tubes from said tubular member for sealing the apertured portion of said tubular member from the outside of said tank when said feed tube is removed therefrom.

2. The filter set forth in claim 1 further comprising first and second conduits coupled to said feed tube externally of said tank,
   one of said conduits being provided for connection to a source of liquid to be filtered and
   the other of said conduits being provided for connection to a source of pressurized air.

3. For use in processing apparatus of the type having a sealable tank defining a processing chamber and a fluid transfer device extending through the wall of said tank into said chamber, the improvement residing in said fluid transfer device and comprising, a first tubular member sealed to said wall over an opening therein and extending into said chamber, a second tubular member slidably received in said first tubular member and being provided with an orifice, said first tubular member having therein an aperture spaced from the inner end thereof, a valve seat mounted on said first tubular member near the outer end thereof, a valve member disposed within said first tubular member and axially movable between a non-sealing position near the inner end of said first tubular member and a sealing position in engagement with said seat near said outer end of said first tubular member, means removably securing said valve member to the inner end of said second tubular member and accessible from outside said tank when said valve member is in sealing engagement with said valve seat, whereby axial withdrawal of said second tubular member from said first tubular member moves said valve member into sealing engagement with said valve seat and permits disassembly of said second tubular member and complete removal from said second tubular member without connecting said chamber to the ambient atmosphere.

4. The invention set forth in claim 3 wherein said valve member has an external cross-section different from the internal cross-section of said first tubular member to provide a passage extending between said second tubular member and said aperture to transfer fluid around said valve member as it is moved from the non-sealing position to the sealing position.

5. The invention set forth in claim 3 wherein said valve seat sealingly engages said tubular member when it is disposed in said first tubular member.

6. The invention set forth in claim 3 wherein said valve member and said first tubular member have mutually engaging shoulders providing a stop to prevent withdrawal of said valve member therefrom.

7. The invention of claim 3 wherein said aperture is disposed at the top of said first tubular member and an imperforate member is secured to said first tubular member over said aperture for defining an air space above said aperture, said imperforate member having a skirt portion depending below said first tubular member and being open at the bottom.

8. A filter including a tank defining a chamber containing a finely granulated filter medium and a liquid feed device extending through the tank into said medium, said liquid feed device comprising a housing tube having an aperture disposed near the inner end thereof within said medium, a feed tube loosely and slidably disposed within said housing tube and being apertured, a valve seat mounted on said housing tube near the outer end thereof and surrounding the bore therein, a valve member axially movable between a sealing position near the outer end of said housing tube in engagement with said seat and a non-sealing position near the inner end of said housing tube, and means for removably securing said valve member to said feed tube and accessible from outside said tank when said valve member is in sealing engagement with said valve seat, whereby axial withdrawal of said feed tube from said housing tube moves said valve member into sealing engagement with said seat.

9. The combination of a first tube having a first end and a second end and further having a fluid feed opening therein remote from said first end, a second tube axially slidable within said first tube and having a fluid feed orifice therein, cooperable sealing means on said tubes for sealing the inner wall of said first tube to the outer wall of said second tube, and valve means axially movable between a non-sealing position within said first tube to a sealing position closing said first tube at a location between said first end and said fluid feed opening, and securing means connecting said valve means to said second tube, said securing means being disposed within said first tube remote from said first end whenever said valve means is in an operative non-sealing position and outside said first tube whenever said valve means is in a sealing position.

References Cited

UNITED STATES PATENTS

| 417,039 | 12/1889 | Hyatt | 210—289 X |
| 529,471 | 11/1894 | Arendell | 210—266 |
| 629,376 | 7/1899 | LeLand | 210—349 |
| 1,438,797 | 12/1922 | Vachier | 210—193 X |
| 1,979,197 | 10/1934 | Harf | 210—291 X |
| 2,057,779 | 10/1936 | Jacobs | 210—234 X |
| 2,564,402 | 8/1951 | MacArthur | 15—406 X |
| 2,643,772 | 5/1953 | Martin | 210—289 X |

FOREIGN PATENTS

| 352,465 | 7/1931 | Great Britain. |

REUBEN FRIEDMAN, *Primary Examiner.*

J. DE CESARE, *Assistant Examiner.*